United States

Schwartz

4,096,441

Jun. 20, 1978

[54] TEST INSTRUMENT FOR TRANSMITTERS

[75] Inventor: Edwin L. Schwartz, Los Angeles, Calif.

[73] Assignee: Rite Autotronics Corporation, Los Angeles, Calif.

[21] Appl. No.: 731,812

[22] Filed: Oct. 12, 1976

[51] Int. Cl.$^2$ .......................... H04B 1/04; H04B 17/00
[52] U.S. Cl. .................... 325/133; 324/58 B; 324/95; 325/67
[58] Field of Search .............. 325/133, 150, 178, 67; 324/58 R, 58 A, 58 B, 95

[56] References Cited

U.S. PATENT DOCUMENTS

| | | | |
|---|---|---|---|
| 3,179,884 | 4/1965 | Szajerski | 324/95 |
| 3,848,189 | 11/1974 | Pope | 324/95 |

*Primary Examiner*—Robert L. Griffin
*Assistant Examiner*—Marc E. Bookbinder

*Attorney, Agent, or Firm*—Robert E. Geauque

[57] ABSTRACT

The herein disclosed test instrument includes an arrangement for measuring the standing wave ratio of a transmitter, antenna combination which comprises a printed circuit board having a first conductive path thereon adapted for connection in series with the energy flowing between a transmitter and its associated antenna, a second conductive path contiguously disposed on the printed circuit board such that energy is electro-magnetically coupled from the first to the second conductive paths; circuit means for sequentially measuring the energy flowing in opposite directions along the second conductive path; and meter means for displaying the ratio of the measured energy. The test instrument further includes a circuit for measuring the transmitter's output power wherein the "loading" of the metering circuit on the transmitter is substantially reduced.

4 Claims, 4 Drawing Figures

TEST INSTRUMENT FOR TRANSMITTERS

BACKGROUND OF THE INVENTION

The recent widespread use of radio frequency (RF) transmitters, such as in citizen band (CB) radios, for example, has created the need for an efficient and economical test instrument which can measure operational characteristics such as the standing wave ratio (SWR) of the transmitter, antenna combination; the output power from the transmitter; and the radiated power from the antenna.

The standing wave ratio measurement compares the value of the RF signal fed toward the antenna, to the value of the RF energy reflected therefrom. Heretofore, this measurement has normally been accomplished by means which include a wire electro-magnetically coupled to a segment of the transmission cable between the transmitter and the antenna, and means for sequentially measuring the relative percentage of the energy thereon which is traveling in the forward and reverse directions, respectively. From a functional point of view, this arrangement has proven satisfactory; however, it does not lend itself to economy in manufacture which may be realized from printed circuit designs.

The measurement of transmitter output power has normally been implemented by means for applying a rectified sample of the output power from the transmitter to a parallel combination of a potentiometer and a capacitor, with the wiper of the potentiometer being electrically connected to a meter, see FIG. 4. Such an arrangement loads the transmitter and prevents calibration for maximum allowable power. This is an important factor in applications such as CB radios where power is limited by government regulation.

SUMMARY OF THE INVENTION

A primary object of the subject invention is to provide an efficient and economical test instrument for measuring the operational characteristics of a transmitter.

Another more specific object is to provide an improved standing wave ratio meter which is adapted for implementation by printed circuit techniques.

A further object is to provide a standing wave ratio meter which is adapted for implementation by means of printed circuit techniques and yet which provides good measurement sensitivity.

Yet another object is to provide an improved test instrument for measuring the output power of an RF transmitter.

In accordance with one preferred embodiment of the subject invention, opposite ends of a first curved conductive path on a printed circuit board terminate at connectors adapted for coupling to an RF transmitter and its associated antenna, respectively. A second conductive path has a segment thereof which is contiguous to said first path and energy is electro-magnetically coupled from the first to the second path. Circuit and switch means are provided for sequentially measuring the energy flowing in the forward and reverse directions on said second conductive path and for displaying the ratio thereof on a meter. The implementation of said first and second conductors as conductive paths on a printed circuit board provides economy of construction. The curvature of these paths allows increased path lengths, for a given size of test unit, and hence improved measurement sensitivity. Further, economy of manufacture results from the switch functions being implemented on the same printed circuit board.

The herein illustrated preferred embodiment further comprises a circuit for rectifying and filtering a portion of the transmitter's output power and then applying it through a series resistive element to a meter for displaying the value of the transmitter's output power. It is believed that the power measuring arrangement of the subject invention extracts approximately one-half the power from the transmitter as does the hereinabove outlined prior art approach. For applications such as citizen band (CB) radios where it is desirable to be able to use the maximum power allowed by government regulation, this is a most beneficial feature.

The novel features of the subject invention are set forth with particularity in the appended claims. The invention will be understood from the following description when read in conjunction with the accompanying drawings in which like reference characters refer to like parts.

DETAILED DESCRIPTION OF THE PREFERRED EMBODIMENT

Figure 1:
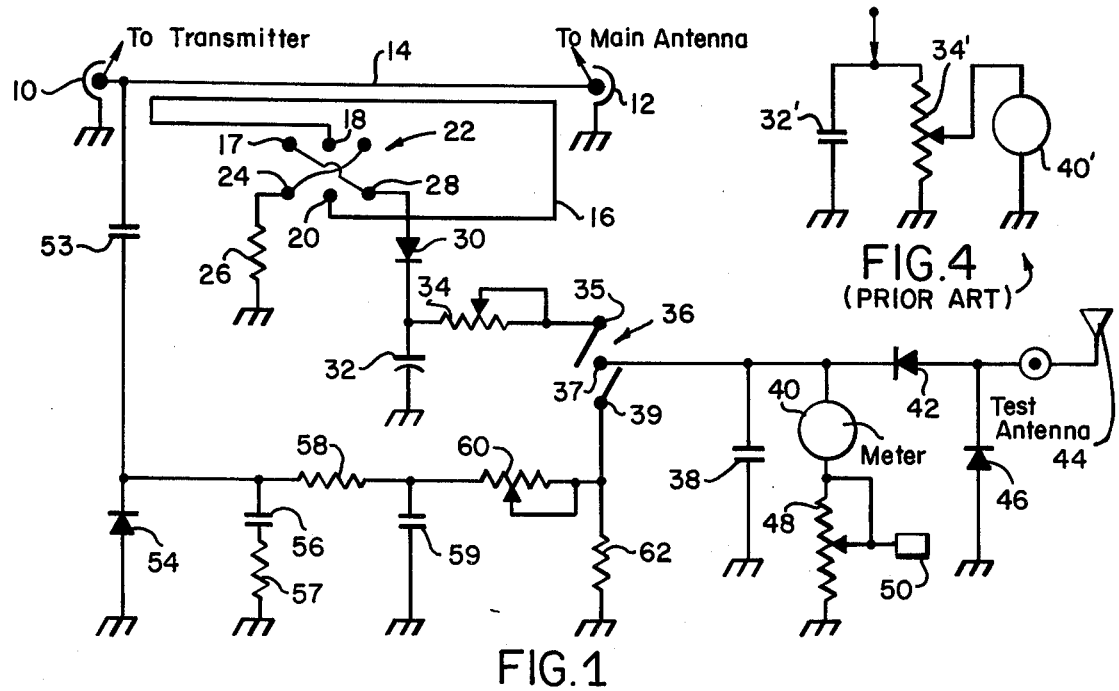
FIG. 1 is a schematic diagram of a test unit in accordance with the subject invention which is adapted for measuring the operational characteristics of RF transmitters.
Figure 4:
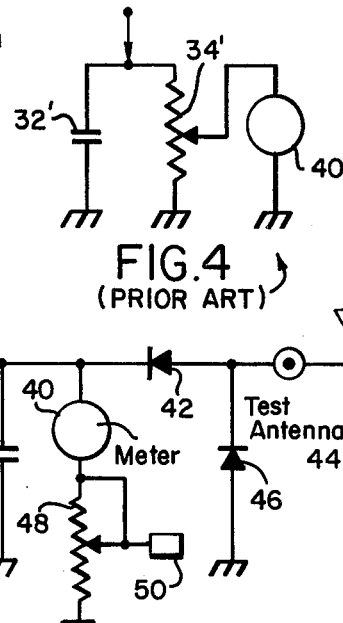
FIG. 4 is a schematic diagram of a prior art circuit for applying a rectified sample of transmitter power to a display meter.

Referring first primarily to FIG. 1, RF type connectors 10 and 12 are connected at opposite ends of a first conductive path 14. A portion of a second conductive path 16 is contiguous to said first path and path 16 terminates in contact points 18 and 20 of a switch arrangement 22. Contact point 24 of switch 22 is connected to a "load" resistor 26; and contact point 28 is connected to the anode of a diode 30.

The cathode of diode 30 is connected to the junction of a capacitor 32 and a potentiometer 34. The other end of potentiometer 34 is connected to one input terminal of a switch 36. Center contact point 37 of switch 36 is connected to a capacitor 38, a meter 40 and the cathode of a diode 42. The anode of diode 42 is connected to a test antenna 44 and to a diode 46.

Figure 3:
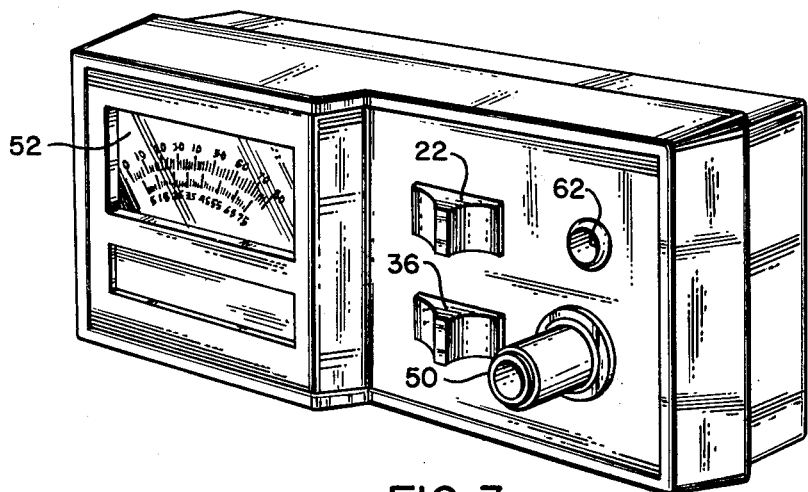
FIG. 3 is a perspective view of said test unit.

In the operation of the standing wave ratio (SWR) portion of the subject invention, the transmitter unit (not shown) is connected to connector 10, and connector 12 is coupled to the main transmitting antenna (not shown). Switches 36 and 22 are in their extreme leftward position (FIG. 3) whereby contact point 35 of switch 36 is connected with point 37; and contact points 17 and 18 of switch 22 are connected together, as are points 20 and 24. It is noted that switches 22 and 36 are preferably printed circuit switches as described in my co-pending application entitled "Slide Switch Assembly Having Flexible Housing With Movable Contacts Mounted on Printed Circuit Board", Ser. No. 727,780 filed Oct. 5, 1976 now U.S. Pat. No. 4,070,715.

In the rightward position of switch 22, end 20 of conductive path 16 is connected to the anode of diode 30 and end 18 is connected to "load" resistor 26. In this position of switch 22, the energy blowing from the transmitter to the main antenna is measured by meter 40. At this point in the standing wave ratio measurement procedure, knob 50 is used to position potentiometer 48 so that meter 40 reads 100 percent (not shown in FIG. 3). Next switch 22 is positioned to its leftward (FIG. 3) extreme position wherein end 18 of path 16 is connected to diode 30 and end 20 is connected to "load" resistor 26. In this position, the energy reflected from the main antenna is measured by meter 40 but because of the calibration procedure of the preceding step, display 52 (FIG. 3) of meter 40 indicates the standing wave ratio.

Figure 2:
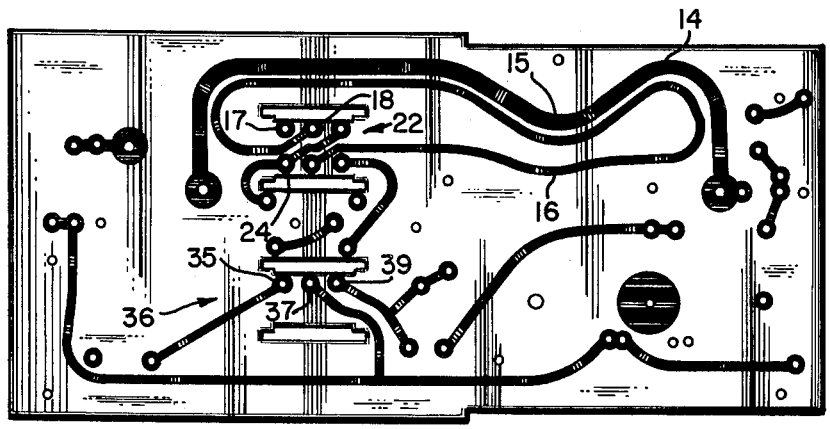
FIG. 2 is a plan view of a printed circuit board that may be used in the test unit of FIG. 1.

It is important to note in FIG. 2 how the curvature 15 of conductive path 14, for a given length of printed circuit board 11, allows a greater length of this conductive segment on the printed circuit board. This curvature allows a greater common "run" for path 14 and contiguous conductive path 16, and consequently a larger value of signal is electromagnetically coupled from path 14 to path 16. This increases the sensitivity of the standing wave ratio measurement.

In the disclosed embodiment, by way of example and not limitation, resistor 26 is 100 ohms, potentiometer 34 is 4.7 K ohms and capacitor 32 is 0.001 microfarads.

In operation of the power measurement portion of the invention, switch 36 is in its extreme rightward position, and a portion of the transmitter's output power is rectified by diode 54, filtered by elements 56-59 and applied through calibration potentiometer 60 and switch 36 to meter 40. Potentiometer 60 which is used to calibrate the power measurement circuit also provides substantial series resistance between the transmitter and the meter. As noted previously, this series resistance provides the important function of reducing the meter load on the transmitter such that the transmitter may provide maximum allowable power. For example, in one preferred embodiment, potentiometer 60 is a 47 K ohm device with approximately half that resistance value, depending upon the calibration setting, being in series with meter 40. In said preferred embodiment capacitors 53, 56 and 59 are 5 picofarads, 33 picofarads and 1 microfarad, respectively; and resistors 57, 58 and 62 are 330, 6.8 K and 24 K ohms, respectively.

The power radiated from the main antenna (field strength) may be measured by placing switch 36 in its central position so that neither point 35 or 39 is connected to point 37. A shorting plug (not shown) is provided so that jack 62 is shorted during the standing wave ratio and transmitter power measurement tests. During the radiated power measurements, the shorting plug (not shown) is removed from jack 62 and antenna 44 is inserted. Antenna 44 may be, for example, simply a six inch length of 0.020 inch diameter wire with a loop of a 0.25 inch diameter formed in one end thereof. In this mode, a portion of the RF power transmitted by the main antenna (not shown) is received by test antenna 44, rectified by diodes 42 and 46 and the value of the received radiated power is indicated on meter 40.

Thus having described a new and improved test instrument for measuring the operational characteristics of RF transmitters, what is claimed is:

1. A test instrument for selectively measuring the standing wave ratio between a transmitter and an associated antenna, transmitter output power, and antenna radiated power, comprising:

a printed circuit board having a first conductive path thereon, means adapted for connecting said conductive path in series with the energy flow between the transmitter and antenna, and a second conductive path contiguous to at least a portion of said first conductive path whereby energy is electromagnetically coupled from said first to said second conductive paths;

circuit means for sequentially measuring the energy flowing in opposite directions along said second conductive path and for selectively providing a first signal indicative of said standing wave ratio;

means for selectively providing a second signal indicative of the transmitter's output power;

means for monitoring antenna radiated power and for selectively providing a third signal indicative of said radiated power; and meter means for selectively displaying an indication of said first, second or third signals.

2. The test instrument of claim 1 wherein:

said first and second conductive paths each have at least one substantially curved section.

3. The test instrument of claim 1 wherein:

said circuit means is disposed on said printed circuit board and includes a resistive load; a rectifying circuit; and switch means for connecting one end of said second conductive path to said resistive load and the other end to said rectifying circuit, and for selectively reversing said connections.

4. The test instrument of claim 2 wherein:

said circuit means is disposed on said printed circuit board and includes a resistive load; a rectifying circuit; and switch means for connecting one end of said second conductive path to said resistive load and the other end to said rectifying circuit, and for selectively reversing said connections.

* * * * *